April 21, 1970   A. SCHWARZKOPF   3,507,194
PROCESS AND APPARATUS FOR MAKING A CARRYING BAG
OF PLASTIC MATERIAL
Filed Oct. 31, 1966   11 Sheets-Sheet 6
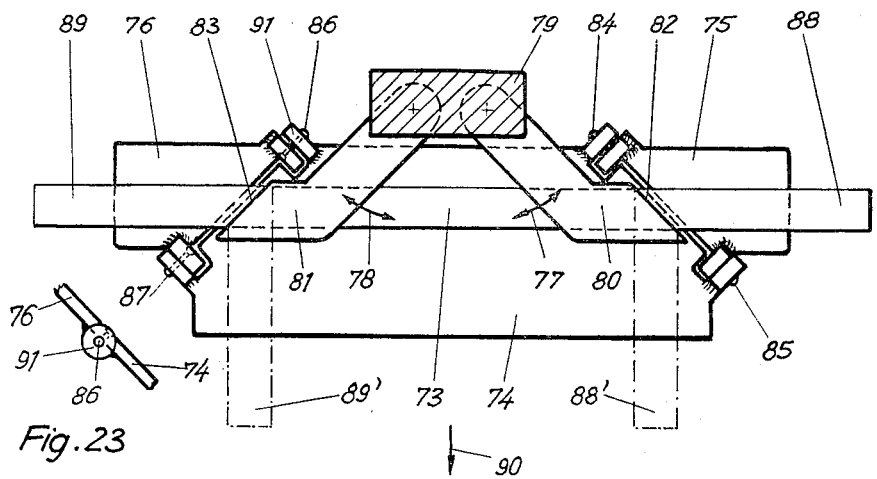
Fig. 22
Fig. 23
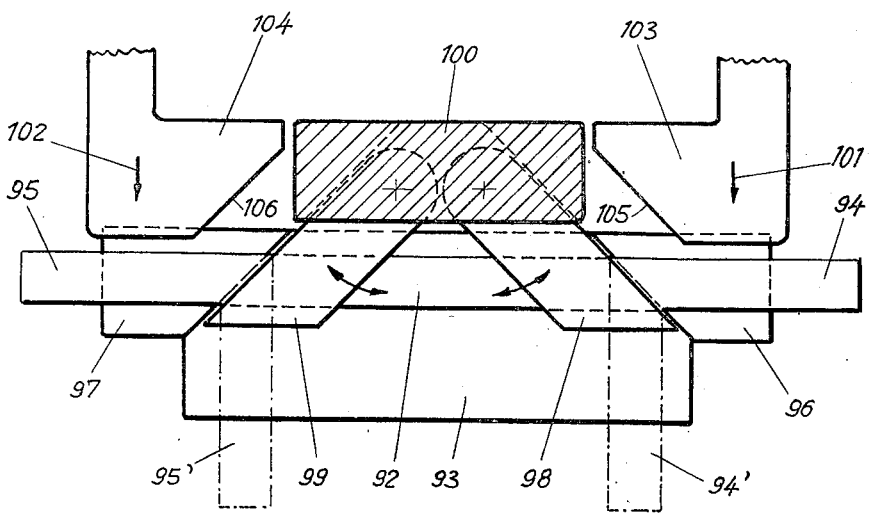
Fig. 24
INVENTOR
AUGUST SCHWARZKOPF
BY
Woodhams, Blanchard & Flynn
ATTORNEYS April 21, 1970     A. SCHWARZKOPF     3,507,194
PROCESS AND APPARATUS FOR MAKING A CARRYING BAG
OF PLASTIC MATERIAL
Filed Oct. 31, 1966     11 Sheets-Sheet 8

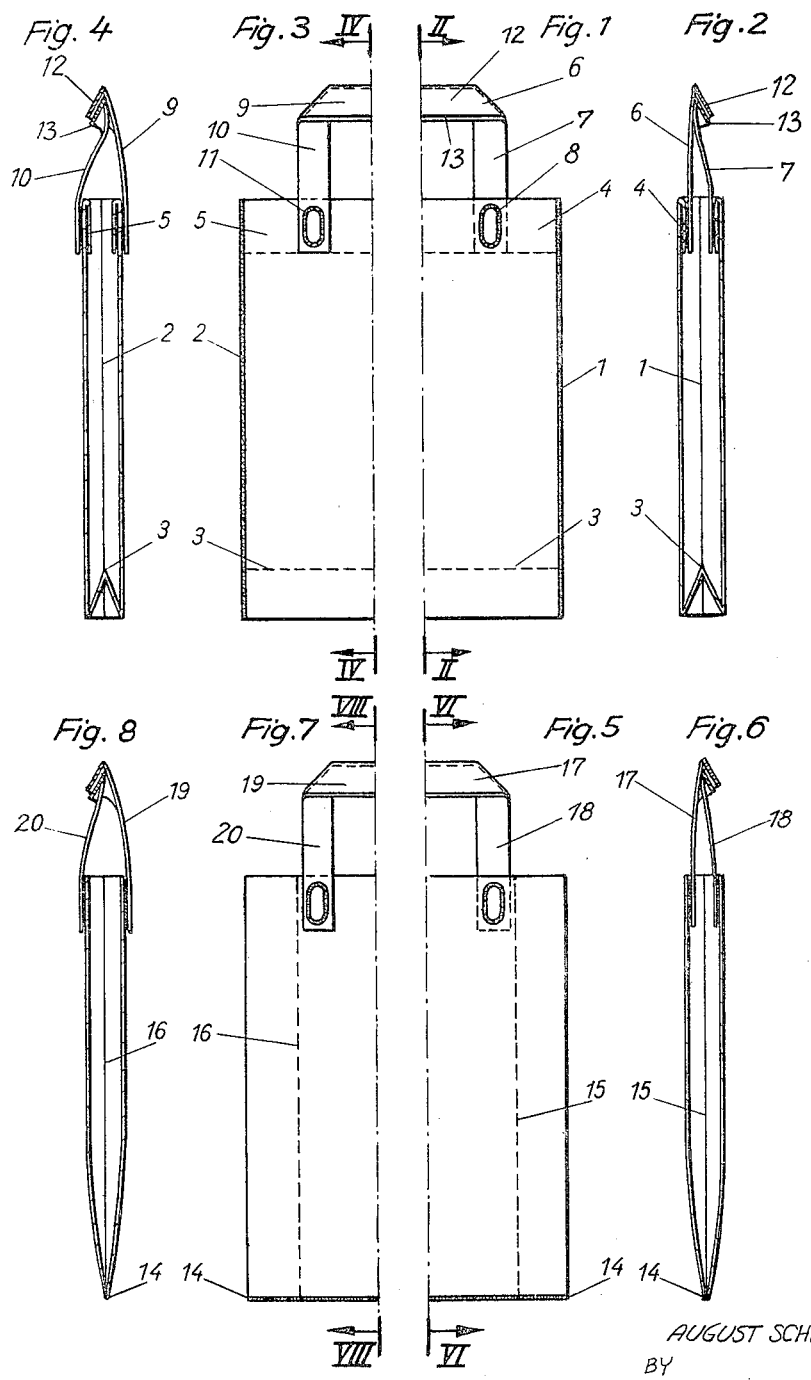

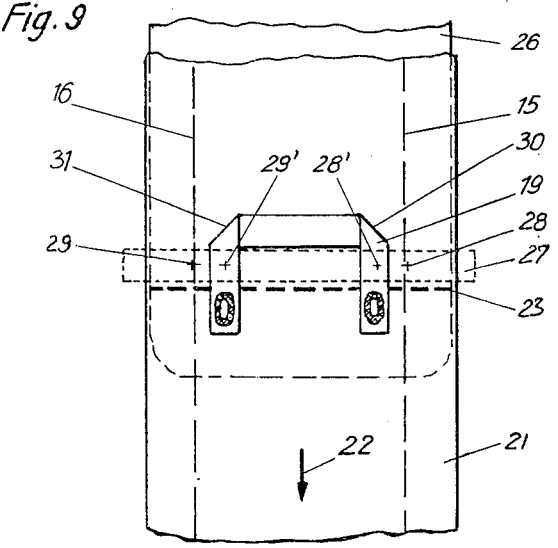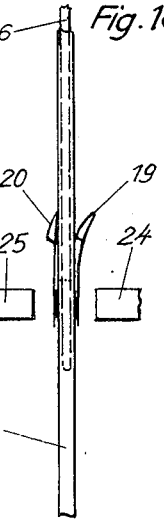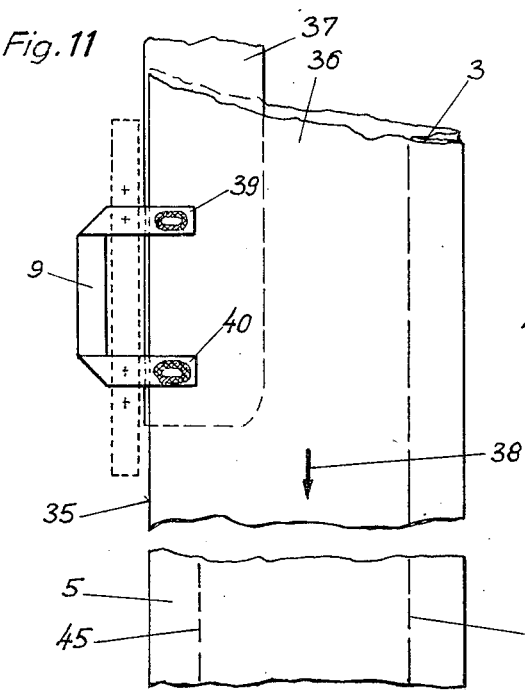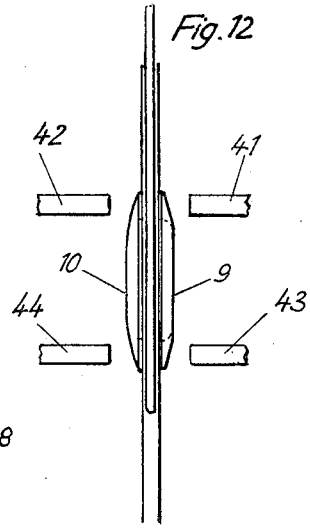

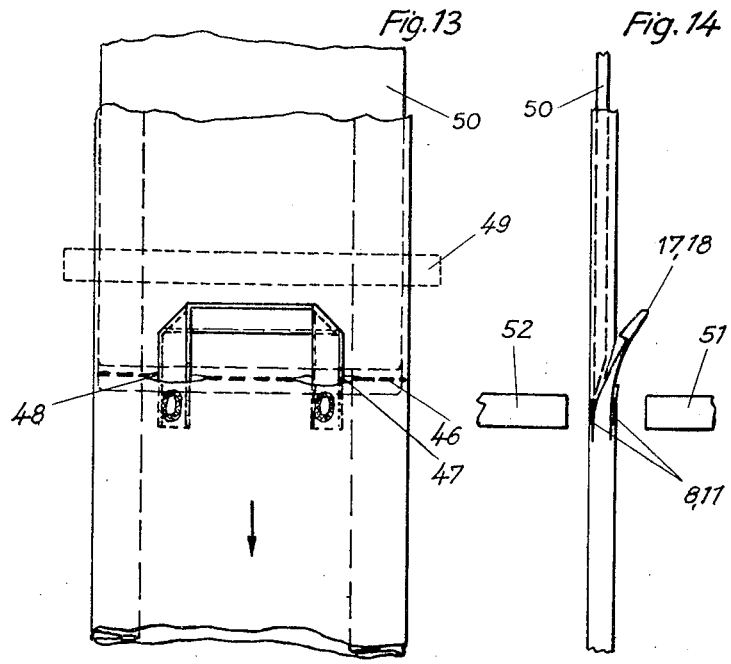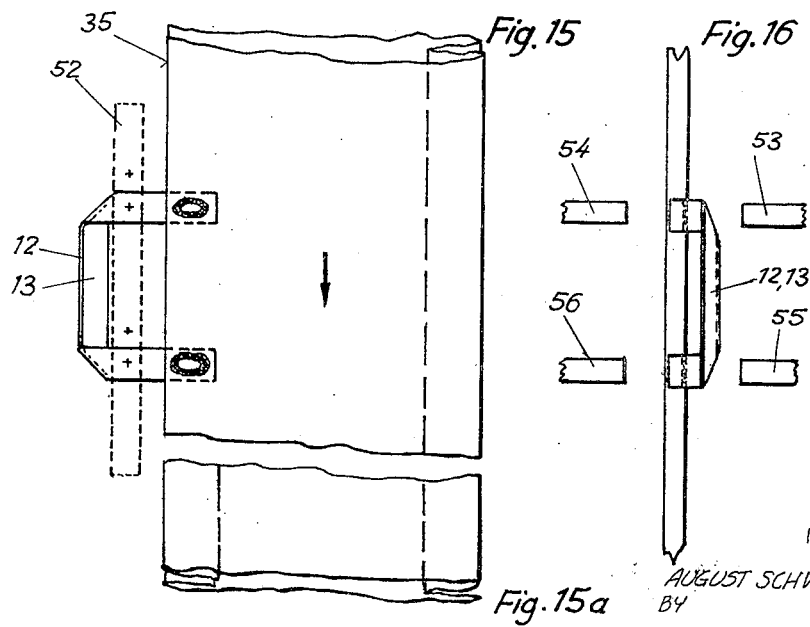

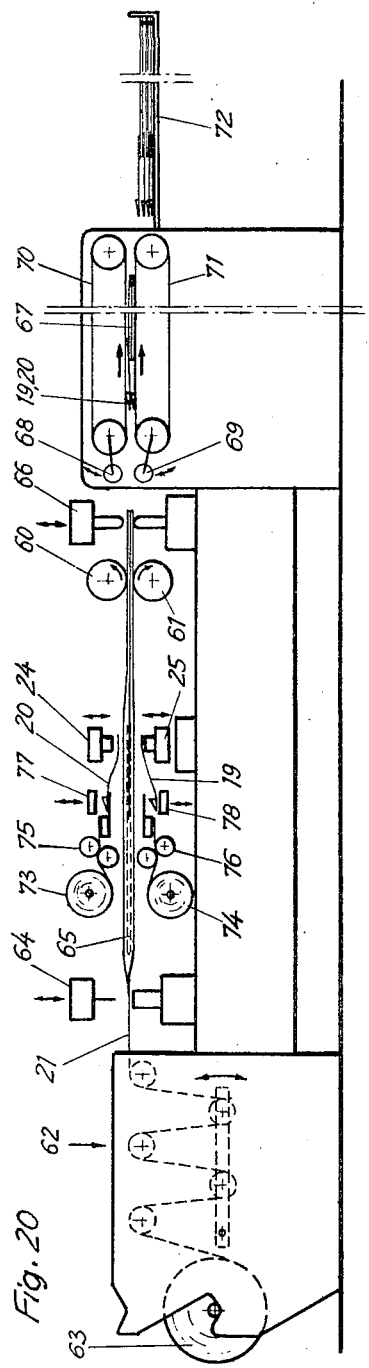

INVENTOR
AUGUST SCHWARZKOPF
BY
Woodhams, Blanchard & Flynn
ATTORNEYS

April 21, 1970  A. SCHWARZKOPF  3,507,194
PROCESS AND APPARATUS FOR MAKING A CARRYING BAG
OF PLASTIC MATERIAL
Filed Oct. 31, 1966  11 Sheets-Sheet 11

INVENTOR
AUGUST SCHWARZKOPF
BY
Woodhams, Blanchard & Flynn
ATTORNEYS

United States Patent Office 3,507,194
Patented Apr. 21, 1970

3,507,194
PROCESS AND APPARATUS FOR MAKING A CARRYING BAG OF PLASTIC MATERIAL
August Schwarzkopf, Heinestrasse 2, Lengerich, Westfalen, Germany
Filed Oct. 31, 1966, Ser. No. 590,860
Int. Cl. B31b 1/00
U.S. Cl. 93—8                                28 Claims

ABSTRACT OF THE DISCLOSURE

A process an apparatus for manufacturing a carrier bag from plastic material. The body of the bag is formed of a two-ply plastic web which intermittently moves along a path of travel. A U-shaped carrying handle having a central portion and a pair of leg portions is secured to each of the two plies so that the central portions of the two handles are folded downwardly in the same direction. The handles are welded to their respective plies in a manner that a welding together of confronting inside surfaces is avoided. The web is then severed so as to form the individual bags.

---

Figure 17:
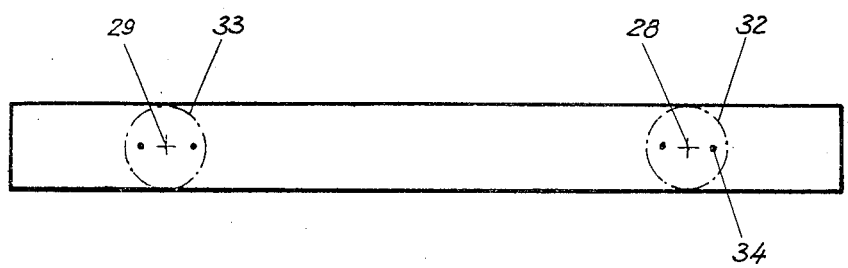

Carrying bags are known which have folded, U-shaped carrying handles that are attached to the top edges of the bag. In such bags it is known to fold the U-shaped central portions of both U-shaped handles inwardly towards each other, towards the bag (U.S. patent specification No. 2,603,408) or towards the outside, away from each other, away from the bag (German patent specification No. 811,601). In these known bags, which are made of paper and have adhered handles of paper, the limbs of the U-shaped handles are secured to the outside of the bag. A carrying bag having approximately V-shaped carrying handles has also been disclosed. This bag and its handles consist of polyethylene plastics material and the handles are welded to the outside or to the inside of the bag walls. In both handles, the folded portion was inwardly directed, as with the first-mentioned, known carrying bag, so that the two grip portions abut when the bag is flattened (German Utility Model No. 1,841,-377).

These carrying handles, which are symmetrical with respect to the center plane and are infolded or outfolded in their central portion, have the disadvantage that they can individually fall to different sides and block when they are superimposed. These disadvantages are particularly inherent in such bags of unstable plastics material and have an adverse effect on the manipulation of the bags during the stacking and shipment thereof and when the bags are removed being prepared for use. Besides, the bag tends to open easily, which fact opposes its simple manipulation during said operations. The known handles have also the disadvantage that when the bag is filled and the two handle portions are flattened, their grip portions fold one against the other or apart from each other. This is inconvenient in either case and causes both grip portions to lie one beside the other in the hand so that they require more space than is afforded by the folded hand. Hence, the grips are upset and do not lie conveniently in the hand.

Plastics material which has been extruded through annular dies is available as continuous, seamless tubing, which can be used in the manufacture of bags. This has the advantage that it is not necessary to form a tube in a separate operation involving a formation of a longitudinal seam. The continuous tubing may be made with one or two gussets. The tubing is longitudinally conveyed in the manufacture of bags with or without gussets, and with a welded bottom seam, or is transversely conveyed in the manufacture of bags with or without a buttom gusset and with or without a two-ply filling rim and two side seam welds. In the manufacture of bags with transverse conveyance, a side fold line or an internal gusset fold line is cut open. Instead of severing a seamless tubing on one side, an open web may be used as a starting material and may be folded into a corresponding half-tubing. This method is mainly adopted for reasons of printing technology.

As the manufacture of a product in a single operation and on a single machine affords advantages in itself and a second operation would require a singling of the bags, which is difficult with bags of plastics material owing to their flexibility and electric charge, it is an object of the invention to enable a manufacture of the novel carrying bags in the course of the formation of the bags.

The invention will now be explained in detail with reference to illustrative embodiments shown on the accompanying drawings, in which FIG. 1 shows the right-hand half of a carrying bag according to the invention having a side seam and internally welded carrying handles, FIG. 2 is a sectional view taken on line II——II of FIG. 1, FIG. 3 shows the left-hand half of a carrying bag according to the invention having a side seam and externally welded carrying handles, FIG. 4 is a sectional view taken on line IV—IV in FIG. 3, FIG. 5 the right-hand half of a carrying bag according to the invention having a bottom seam and internally welded carrying handles, FIG. 6 a sectional view taken on line VI—VI of FIG. 5, FIG. 7 the left-hand half of a carrying bag according to the invention having a bottom seam and externally welded carrying handles, FIG. 8 a sectional view taken on line VIII—VIII in FIG. 7, FIG. 9 a top plan view showing a tubing in a phase of the manufacture of carrying bags having a bottom seam and externally welded carrying handles, FIG. 10 a side elevation associated with FIG. 9, FIG. 11 a top plan view showing a half-tubing in a phase of the manufacture of carrying bags having a side seam and externally welded carrying hndles, FIG. 11a a top plan view showing another embodiment of a half-tubing, FIG. 12 a side elevation associated with FIG. 11, FIG. 13 a top plan view showing a tubing in a phase of the manufacture of carrying bags having a bottom seam and internally welded carrying handles, FIG. 14 a side elevation associated with FIG. 13, FIG. 15 a top plan view showing a half-tubing in a phase of the manufacture of carrying bags having a side seam and internally welded carrying handles, FIG. 15a a top plan view showing another embodiment of a half-tubing and FIG. 16 a side elevation associated with FIG. 15, FIGS. 17 to 19 show in top plan views three phases of the shaping of a carrying handle blank into a U-shaped carrying handle as taught by the invention.

Figure 25:
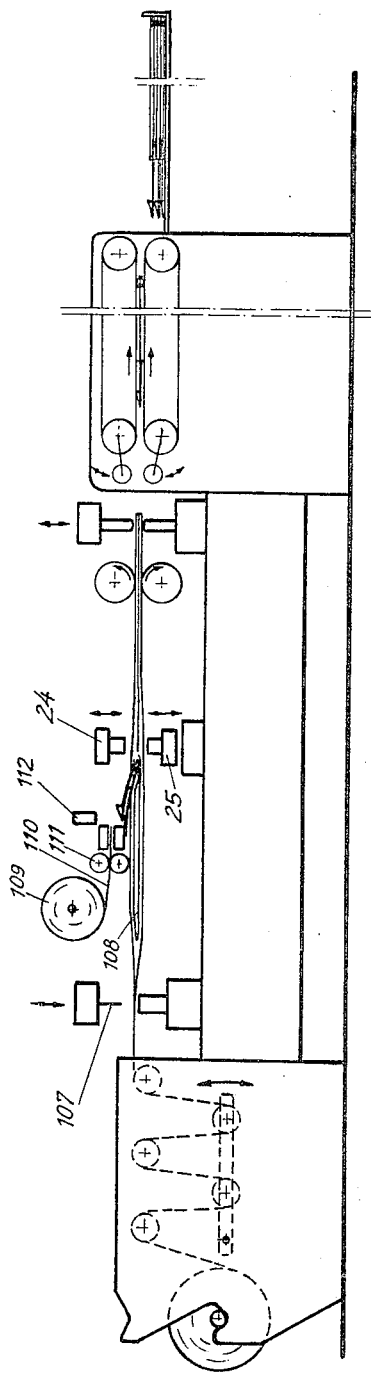
Figure 26:
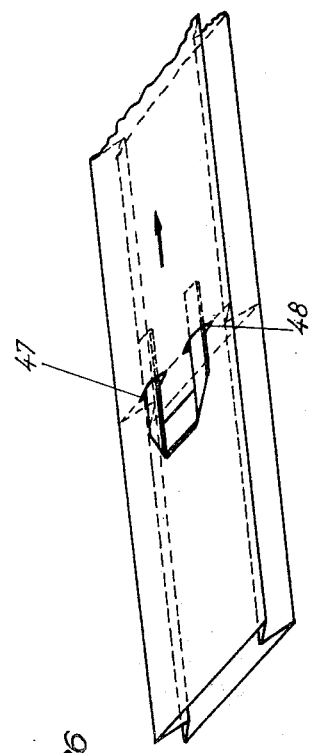
Figure 28:
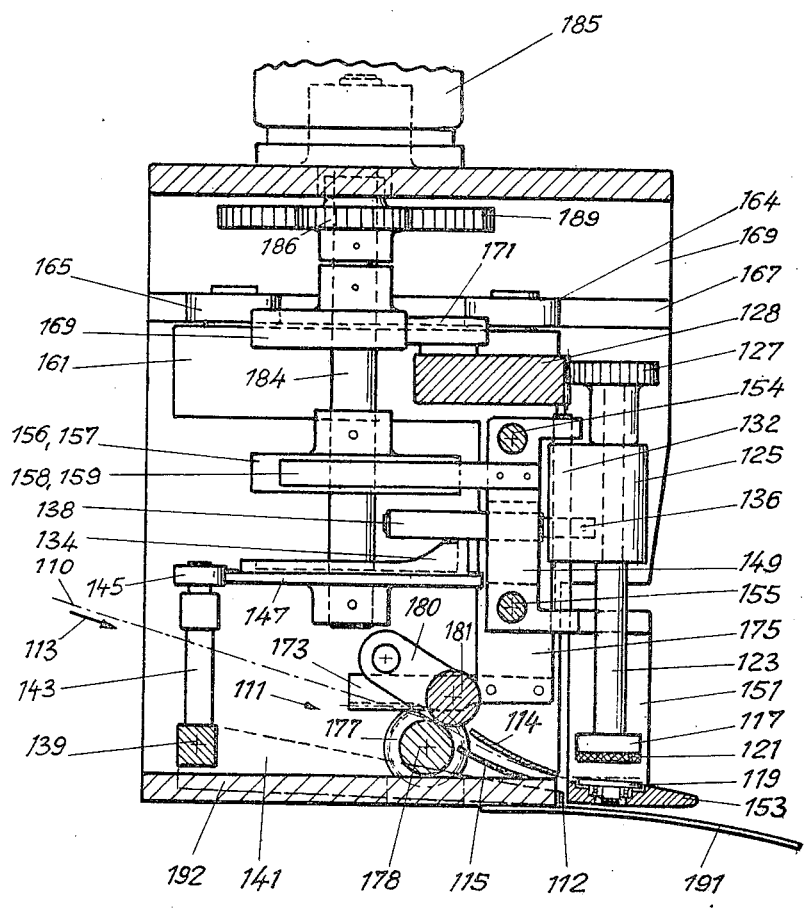
Figure 29:
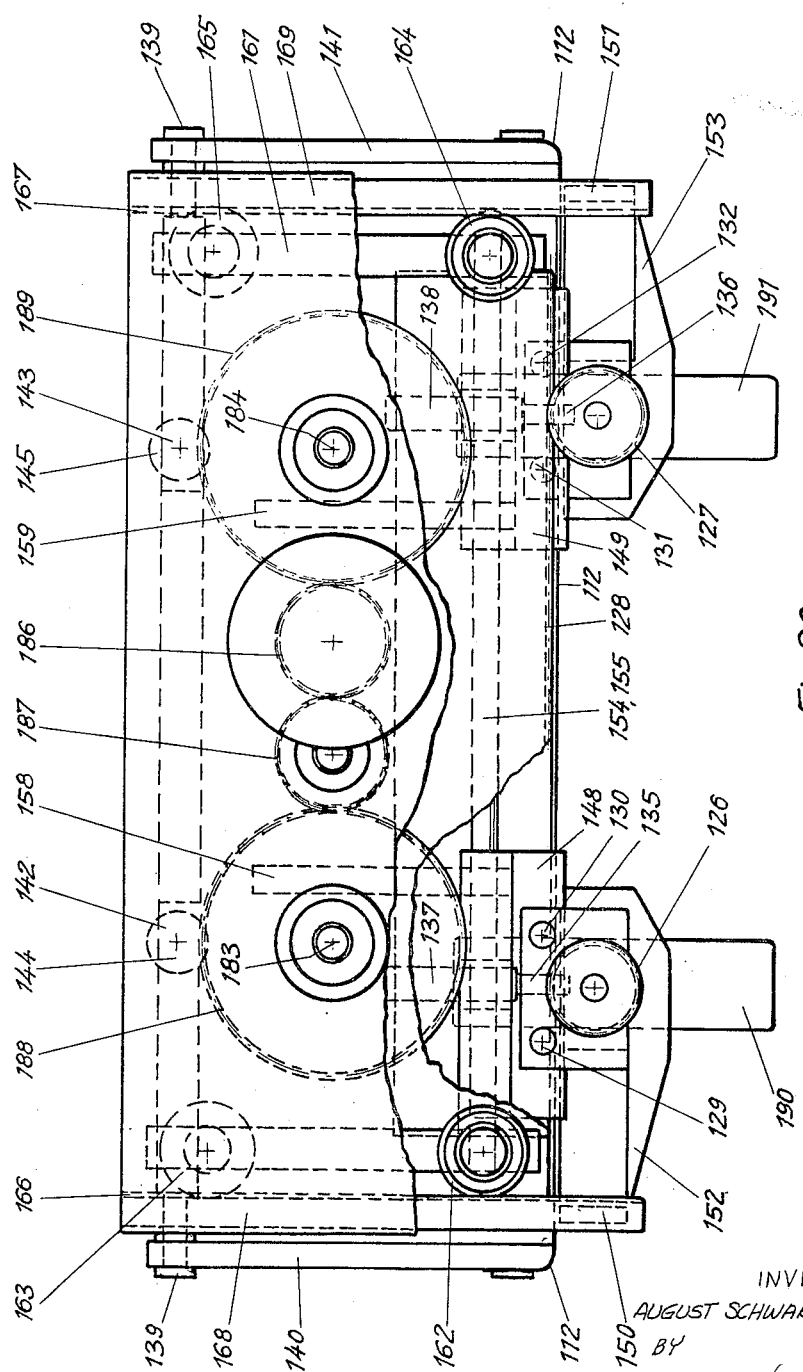

FIG. 20 is a diagrammatic side elevation showing an apparatus for the manufacture of carrying bags having a bottom seam and externally welded carrying handles, FIG. 21 a top plan view associated with FIG. 20, FIG. 22 a top plan view showing a first embodiment of a device for folding a handle blank into a U-shape, FIG. 23 a fragmentary view associated with FIG. 22, FIG. 24 a top plan view showing a second embodiment of an apparatus for folding a handle blank into a U shape, FIG. 25 a diagrammatic side elevation showing an apparatus for manufacturing carrying bags having a bottom seam and a pair of internally welded carrying handles, FIG. 26 a perspective view showing a tubing and a pair of inserted carrying handles, FIG. 27 a front elevation showing a third embodiment of a device for manufacturing and inserting U-shaped carrying handles, FIG. 28 a side elevation associated with FIG. 27 partly in section, FIG. 29 a top plan view associated with FIG. 27, FIG. 30 a longitudinal sectional view showing the tubing and a pair of U-shaped carrying handles before their insertion into the tubing, FIG. 31 a top plan view associated with FIG. 30 and FIG. 32 a perspective view showing the mandrel which is disposed within the tubing of FIGS. 30 and 31.

FIGS. 1 to 4 show carrying bags according to the invention having welded side seams 1 and 2. In these embodiments, the carrying bags may have a bottom gusset 3. Alternatively, this gusset may be eliminated and the bottom be formed in known manner only by a bottom fold. The carrying bag having welded side seams may have a backfolded filling rim 4 or 5 or may have only a single-ply filling rim.

In FIGS. 1 and 2, U-shaped carrying handles 6 and 7 are secured to the inside surfaces of the respective bag walls and to any infolded rim 4 thereof by a seam weld 8, which joins also the backfolded rim to the bag wall.

In FIGS. 3 and 4, U-shaped carrying handles 9 and 10 are welded to the outside surfaces of respective bag walls. The seam weld 11 is shown, e.g., in the shape of an oval ring and may suitably include also any backfolded rim to fix the same.

The grip or central portions 12 and 13 of both U-shaped handles 6, 7 or 9, 10 extends toward the same side in space so that the carrying handles are nonsymmetrical with respect to the center plane of the bag. This plane is defined by the seam welds 1 and 2. The central portion 12 extends inwardly toward the center plane of the bag and the grip portion 13 is folded outwardly, away from the center plane of the bag, and downwardly. This enables an interengagement of the grip portions of the two carrying handles in the manner shown so that the outfolded grip portion 13 lies behind the infolded grip portion 12 and both U-shaped handles when welded to the outside, as handles 9 and 10, contact each other at least throughout their free length when the bag is closed. The drawing shows the bag in a slightly opened condition. Handles welded to the inside, such as handles 6 and 7, contact each other throughout their length when the bag is closed. This feature results in a desirable stiffening of the unitary grip, which can be conveniently seized. The bags can be stacked properly and a certain closing effect is obtained because the grips do not tend to fall apart.

As regards the carrying handles and their attachment to the outside or inside surfaces of the bag, the carrying bags shown in FIGS. 5 to 8 do not differ from the carrying bags shown in FIGS. 1 to 4. The bags according to FIGS. 5 to 8 differ from those of FIGS. 1 to 4 only in that they have a bottom seam weld 14. Such a bag having a bottom seam may have side gussets 15, 16, or may have no such gussets so that a known, flat bag is obtained. In the bag shown in FIGS. 5 and 6, the U-shaped handles 17, 18 are welded to the inside. In the bag of FIGS. 7 and 8 the U-shaped handles 19, 20 are welded to the outside.

FIGS. 9 and 10 show the manufacture of a bag having a bottom seam and externally welded carrying handles with longitudinal conveyance from an extruded, seamless tubing 21 of plastics material, which is intermittently moved in the direction of the arrow 22. The tubing is provided with transverse perforation lines 23, which are spaced apart by the desired bag length. Along these lines, the head portion of the finished bag is then torn from the bottom portion of a succeeding bag, which is to be provided with the bottom seam weld. The U-shaped carrying handles 19 and 20 have been welded to both sides of the tubing, e.g., by means of the welding punches 24 and 25. A mandrel 26 is disposed within the tubing to prevent an inadmissible welding together of the tubing plies. A handle blank 27 is shown in dotted lines and is moved by a preferred folding process according to the invention from the position shown in the drawing to assume directly a U shape and a welding position. During this operation, the points which are marked with the crosses 28 and 29 are pushed to the respective positions 28' and 29' whereas the simultaneous or subsequent pivotal movement of the strip end portions causes the central portion of the strip to assume its desired final position while forming the two 45° folds 30, 31. In this operation, the central portion of the strip is arched in such a manner that the central portion of one handle 19 is folded to extend toward the tubing and the central portion of the other handle 20 is folded to extend away from the tubing.

Figure 18:
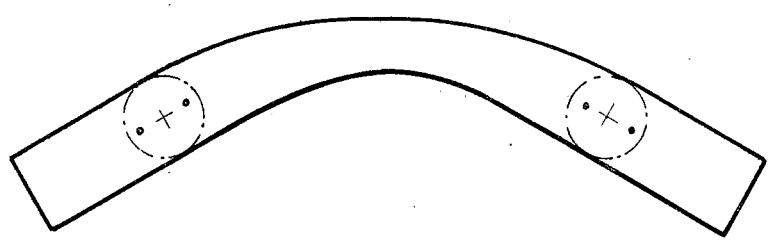
Figure 19:
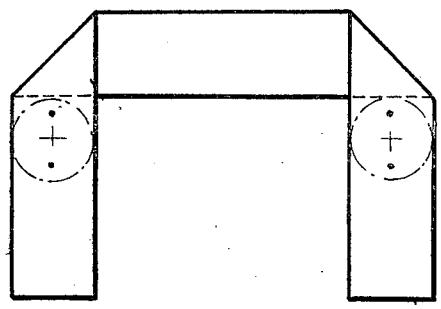

FIGS. 17 to 19 show on an enlarged scale three phases of the formation of the handle as taught by the invention. The dash-dot lines 32, 33 indicate the contour of the engaging tool, the crosses represent again the intermediate engaging points 28, 29, and the points 34 represent needles of the tools. The tools 32 and 33 are approached to each other and rotated so that the extended handle blank shown in FIG. 17 is formed into a U shape shown in FIG. 19. In the showing of FIGS. 17 to 19 it is assumed that the approaching and rotational movements of the tools are carried out at the same time. Alternatively, the tools may be approached to each other in a first step, wherein the central portion of the strip is arched to one side or the other, whereafter each tool is rotated through 90° about its own axis so that the central portion of the strip is folded to the other side. The side to which the central portion of the strip is arched will be determined only by a slight curvature or a corresponding support in the initial condition.

The dotted lines 15 and 16 in FIG. 9 indicate that side gussets may be formed, which are not provided in FIG. 10. When the tubing has side gussets, the mandrel 26 comprises two layers so that it can extend into the tubing above and below the side gusset. FIGS. 9 and 10 show the tubing at a standstill immediately after the welding of the U-shaped handles. When a complete carrying bag has been torn from the perforation line 23, the handles are interengaged by being fitted one into the other, as is shown in FIG. 8.

FIGS. 11 and 12 show the corresponding process in the manufacture of bags having a side seam and externally welded carrying handles. The half-tubing 36 is open at its left hand edge 35 and is intermittently fed in the direction of the arrow 38 over a stationary mandrel 37. The limbs 39 and 40 of the U-shaped handles to be formed are pivotally moved to their welding position above and below the tubing from the initial position, shown by way of example in dotted lines, of the extended handle strip, and are welded, e.g., by means of the welding jaws 41–44, while the mandrel 37 prevents a nonadmissible welding together of the tubing plies. The half-tubing 36 has, e.g., a bottom gusset 3. The half-tubing may be formed by slotting an extruded, seamless tubing along the edge 35, or from a flat web, which is folded about a tube-forming mandrel. FIG. 11a shows such a half-tubing having a bottom gusset 3 and infolded edge portions 5, which are preferably obtained in that a seamless tubing, which has gussets on both sides, is severed along the inner fold line 45 of one side gusset.

In bags having a side gusset and externally welded handles, the latter are also separately made for each side and must be subsequently fitted one into the other for interengagement. FIGS. 13 and 14 correspond to FIGS. 9 and 10 with the difference that the carrying handles are welded to the inside. For this purpose, the perforation line 46 has two slits 47 and 48 respectively disposed adjacent to the two limbs of the carrying handles. For reasons of manufacturing technology, these slits extend through both plies of the tubing. The incisions in one tubing ply are utilized to enable an insertion of the four limbs of a previously combined pair of handles between the tubing plies and into welding position. For this reason, the carrying handles had to be given their U shape before they were inserted. Hence, the U-shaped handles must be displaced after they have been manufactured. The double strip blank 49 shown in dotted lines is in a position behind that shown in FIG. 9 while the U shape is imparted to it. A mandrel 50 does not extend into the welding region and ensures the spreading of the tubing plies for the insertion. This will be described more in detail hereinafter. Welding is effected, e.g., by the welding jaws 51. A non-permissible welding together of the carrying handle strips is prevented by a separate, non-weldable ply, or a non-weldable layer adhering to the inside surfaces of the carrying handle strips, or a non-weldable surface.

The manufacturing operation illustrated in FIGS. 15 and 16 differs from that shown in FIGS. 11 and 12 only in that the U-shaped handles are welded to the inside. As the two tubing plies may be held spaced at the open side 35 by simple means in the region in which the strip end portions are pivotally moved to the U shape according to the process which has been described, the limbs of the pair of handles may enter between the plies and assume their welding position during the pivotal movement so that a separate displacement of the U-shaped pair of handles is not required, contrary to the manufacture of bags having a bottom seam. As a result, the strip blank 52 shown in dotted lines is closely adjacent to the tubing. Welding is then effected by means of welding punches 53 to 56 acting from the outside. A non-permissible welding together of the carrying handle strips is prevented by a parting agent or parting layer between the strips.

Internally welded carrying handles have the special advantage that the two carrying handles are jointly folded to the U shape in a single device and are already interengaged so that a separate operation for this purpose is not required.

A machine for the manufactuer of carrying bags having bottom seams and externally welded, U-shaped carrying handles is shown in FIGS. 20 and 21. A feeding device 60, 61 causes a web 21 to advance intermittently by bag lengths. This web is withdrawn from a known storage device 62, which is fed from a supply roll 63 by a continuously operating feeding means, not shown. When the web is at a standstill, a transverse perforating device 64 produces a transverse perforation line and the welding punches 24 and 25 cause the welding of two U-shaped handles to the upper and lower sides of the web in the position shown in FIGS. 9 and 10. A double-layer mandrel 65 extends beyond the welding station 24, 25 and prevents a non-permissible welding together of the tubing plies. The double-layer mandrel serves at the same time in known manner for inserting side folds 15, 16, as is apparent from FIG. 21. During the standstill of the web, the bottom welding station 66 produces a bottom seam at the leading end of a carrying bag. Immediately after the stopping of the web, the preceding carrying bag 67 has been torn from the perforation and further advanced by pull-off rolls 68, 69, which are pivotally movable into and out of engagement with the bag. This removes the leading carrying handles 19, 20 from the range of the bottom welding station 66. The completed carrying bags are moved by receiving belts 70, 71 to a receiving table 72.

By way of example, the handles may be severed by a cutter 77 or 78 from a web, which has a width corresponding to the length of the extended strip and is withdrawn by a feeding device 75 or 76 from a supply roll 73 or 74. By means of a strip folding device, not shown, the handles may be given a U shape and simultaneously moved to a welding position, in which the grip portions of the upper and lower carrying handles are upwardly directed, e.g., towards the web from below the same and away from the web from above the same, so that the two handles can be subsequently interengaged according to the invention.

FIGS. 22 and 23 show a first embodiment of a handle strip folding device for use when the strip end portions are to be folded so that they extend away from the tubing, such as is the case with the carrying handle 19 to be made below the tubing in the arrangement of FIG. 20. In this case the apparatus according to FIG. 22 should be arranged with a depending orientation. The strip blank 73 lies on a plate 74 and two folding flaps 75 and 76, which are mounted on the plate for a rotation about axes at an angle of 45°. Folding bars 80, 81 are mounted in a bearing 79 for pivotal movement in the direction of arrows 77 and 78 and have folding edges 82 and 83 at an angle of 45°. These bars are disposed above the handle strip 73 to retain it on the plate 74. When the folding flaps 75 and 76 are pivotally moved through 180° about the short pivots 84–87, which are parallel to the folding edges 82 and 83, the strip end portions 88 and 89 will assume the desired position indicated with dash-dot lines at 88' and 89'. In this position, the strip end portions may be welded to the tubing. Before the carrying handle and the tubing are advanced in the direction of arrow 90, the folding bars 80 and 81, which have the strip end portions slung around their folding edges 82 and 83, must be swung toward the center so that the carrying handle is released.

FIG. 23 shows the welding of eyes 91 to the plate 74 and the folding flap 76, respectively. These eyes serve for receiving one (86) of the short pivots 84 to 87.

FIG. 24 shows a second embodiment of a handle strip folding portion which differs from the previously described device in that it requires hardly any space in the direction at right angles to the strip plane so that the device can be used, e.g., for the manufacture of the carrying handle 20, which is disposed in FIG. 20 above the tubing and has strip end portions which are to be folded toward the tubing. The extended strip blank 92 lies again on a plate 93 and its end portions 94 and 95 rest on plates 96 and 97, which adjoin the suitably shaped plate 93 along the desired fold lines, which are at an angle of 45°. The plate 93 is yieldably mounted and is downwardly yieldable at right angles to the strip plane, preferably against spring pressure. Folding bars 98, 99 are pivoted to a bearing 100, which is displaceable at right angles to the strip plane and adapted to be driven in this direction. When pressure is applied to the bearing 100 so that the folding bars 98 and 99, which retain the handle strip 92 on the plate 93, are somewhat lowered, together with the plate 93, the strip end portions 94 and 95 will be raised so that wiping tongues 103 and 104 moved in the direction of arrows 101 and 102 can enter below the strip end portions to fold them about the folding bars 98 and 99 to the desired position, which is indicated in dash-dot lines at 94' and 95'. During this operation, the strip end portions may remain flat on the wiping tongues 103 and 104 while sliding around the effective edge 105 or 106 of the respective wiping tongue. These effective edges extend at an angle of 45°. No space is thus required over this device so that the U-shaped carrying handle made by it is very close to the tubing although the ends of the blank have been folded toward the tubing and the limbs of the handle are in welding position without an inadmissibly large offset, which would be caused by a large distance of the central portion of the grip from the sheeting web.

FIG. 25 shows a device which is similar to that of FIG. 20 with the difference that it is used in the manufacture of bags having a bottom seam and a pair of internally welded carrying handles. The general structure and mode of operation of the apparatus of FIG. 25 agrees exactly with that of FIGS. 20 and 21 and its explanation need not be repeated. An essential difference resides only in the device for making and inserting the pairs of carrying handles. The transverse perforating knife 107 has blades which extend through the tubing adjacent to the limbs of the carrying handles so as to form the slits 47 and 48 through the tubing (FIGS. 13 and 26). The mandrel 108 is also different, as will be explained more fully hereinafter. FIG. 25 shows that the mandrel does not extend under the welding device 24, 25.

The supply roll 109 for the pairs of carrying handles contains at least one two-ply web which has a width that is equal to the extended length of the handle blanks. The two plies are non-weldable at their surfaces which contact each other after unwinding, or a non-weldable, third ply is interposed between the two plies. The feeding device 111 withdraws the two-ply web 110 from this one supply roll 109 in steps which correspond to the desired width of the strip, and successive double strips are severed by the cutting device 112. By a device not shown in FIG. 25, these double strips are given a U shape and then moved in accordance with FIG. 26 through the slits 46 and 48 in the upper tubing ply into the welding position between the two tubing plies.

A preferred embodiment of an apparatus for carrying out the method according to the invention of folding the U-shaped handles is shown in FIGS. 27–29. FIG. 28 shows just as FIG. 25 a supply web 110 for the handle strip blanks. The feeding device generally designated 111 moves the web 110 through guides 114 and 115 between the upper pressure plates 116 and 117 and two lower backing plates 118 and 119, which cooperate with the plates 116 and 117. The extend of this advance is such that a web portion which corresponds to the desired width of the carrying handle protrudes beyond the cutting edge of a heatable knife 112 (FIG. 28). The feeding device 111 is then stopped to interrupt the feeding movement of the supply web 110, which has at least two plies for use in the manufacture of internally welded carrying handles. The pressure plates 116 and 117 are covered with resilient material 120 and 121. Instead of or in addition to the use of this resilient material, the pressure plates may be set with two needles, as is shown in FIGS. 17 to 19. The pressure plates 116 and 117 are mounted at the lower end of spindles 122 and 123, which are rotatably mounted in bearing blocks 124 and 125, respectively, and are provided at their upper end with pinions 126 and 127, respectively, (FIGS. 27 to 29), in mesh with a continuous rack 128. For gripping the web which has been moved between the pressure plates, the bearing blocks 124 and 125 are vertically slidably mounted on guide columns 129 to 132 and moved by means of two rotatable cup cams 133, 134, respectively, (FIG. 28) and rollers 137, 138, respectively, (see also FIG. 29) rolling on the rim of the cams and mounted on pins 135, 136 secured in the bearing brackets. The bearing blocks 124, 125 are initially moved downwardly so that the web is gripped between the backing plates 118, 119 and the pressure plates 116, 117. Then the heated knife 112 is operated to sever a handle blank. For this purpose, the knife is raised by means of two double levers 140/142 and 141/143, which are rotatably mounted at 139 (FIGS. 28 and 29) and have lever arms 140 and 141 which are disposed on opposite sides of the device and carry the knife. The double levers are operated by rollers 144, 145, which are rotatably mounted at the ends of the substantially vertical lever arms 142, 143 and engage two further cams 146, 147, respectively (FIG. 28).

When a blank for preferably one pair of handles has been severed and has been gripped by the pressure plates, the blank is folded as is shown in FIGS. 18 and 19. For this purpose, the pressure and backing plates are approached to each other and rotated. To this end, the guide columns 129–132 which carry the bearing blocks and the spindles for the pressure plates are secured in pairs to cross-slides 148, 149, respectively. By means of two U-shaped yokes 150, 151 best shown in FIG. 27, the backing plates are held against the respective cross-slides. As is shown in section in FIG. 28, the backing plates are rotatably mounted in the lower limbs 152 and 153 of the U-shaped yoke. The cross-slides 148 and 149 are mounted on two horizontal guide rods 154 and 155 best shown in FIGS. 27 and 28 and are respectively moved by two cams 156 and 157 and by follower rods 158 and 159 secured to the cross-slider. In this way, the cross-slides are moved toward each other by twice the width of the strip. Owing to the meshing of the pinions 126 and 127 with the rack 128, this operation causes at the same time a rotational movement of the plates through 90° in the opposite direction so that the desired folding is effected. To determine the direction in which the central portion of the strip is folded, the lower limbs 152 and 153 extend somewhat beyond the backing plates 118 and 119 toward the center and are somewhat angled, as is apparent from FIG. 27, so that the strip cannot arch downwardly but arches upwardly and the central portion is then folded downwardly. If a two-ply web is used, both handles are thus folded at the same time so that they lie one in the other.

To enable, e.g., in the manufacture of bags having a bottom seam, an insertion of the pair of U-shaped carrying handles into the tubing, the pressure and backing plates are also slidable in the direction of the strip end portions 160 (FIG. 30) to be inserted. For this purpose the rack 128 and the horizontal guides 154 and 155, which carry the cross-slides 148 and 149, are secured to a carriage 161, in which four rollers 162–165 are rotatably mounted, which engage mating grooves 166 and 167 in the side plates 168 and 169 of the carrying frame of the entire apparatus so that the carriage is movable in the desired direction. The drive for moving the carriage 161 is derived from two further cams 168 and 169, which act on respective rollers 170 and 171 rotatably mounted in the rack 128.

The movement of the carriage 161 in the stated direction imparts a drive also to the feeding device 111 for supplying a new strip width. For this purpose, racks 172 and 173 are secured to lower side plates 174, 175 of the carriage 161 and in mesh with respective with gears 176, 177 at the ends of the lower feeding roll 178. When the carriage 161, 174, 175 is moved in the inserting direction, in FIG. 28 to the right, the lower feeding roll 178 will be rotated in the clockwise sense to feed the web in cooperation with the pressure-applying, upper feeding roll 181, which is mounted in rocker levers 179 and 180. The cams mounted on the two shafts 183 and 184 are driven by an electric motor 185 through the intermediary of gears 186 and 187 and of gears 188 and 189 secured to the shafts. To depress the tubing on that side of the slits from which the strips are inserted, leaf springs 190 and 191 are secured to the baseplate 191 of the carrying frame of the entire apparatus. These springs do not participate in the advance of the main carriage.

FIG. 30 is a transverse sectional view and FIG. 31 a top plan view showing a portion of a tubing, which has an upper ply 193 and a lower ply 194 and is formed in the upper and lower plies with slits 47, which are aligned with the perforation line 46. The tubing contains the mandrel 108, which is shown once more in perspective in FIG. 32. The tubing is shown in the position in which it has been stopped so that the limbs 160 of a pair of U-shaped handles can be inserted through the slots 47 and 48 and can be subsequently welded. For this purpose, the tubing is stopped when the perforation line is slightly before the upturned end 195 of the mandrel 108, which has a highly reduced forward portion 196. Thus, the upturned end 195 of the offset mandrel prevents a lowering of the upper ply of the tubing beyond the slot 47. At the same time, the leaf springs 190 and 191 (only the latter is shown) strongly depress the upper ply of the wall on the trailing side of the slot 47 so that the slits 47 and 48 (the slit 47 is shown) form openings, which face the limbs 160 of the carrying handle and through which the limbs can be inserted between the plies of the tubing by a movement of the pressure and backing plates 117 and 119 and of the mounting 153 for the backing plate in the direction of the arrow 199. To promote this, the upturned end 195 of the reduced mandrel portion 196 is somewhat idented closely adjacent to the limbs of the carrying handles, as is clearly apparent in FIG. 32 at 197 and 198. This design enables an unobstructed movement of the limbs of the carrying handles between the mandrel and the upper ply of the tubing. The welding punches for welding the respective limbs of the carrying handles to the upper ply and lower plies of the tubing are not shown and are disposed closely behind the upturned end 195 of the mandrel.

What is claimed is:

1. A method of making carrier bags of weldable plastics comprising the steps of:
   intermittently moving a two-ply plastics web through a path of travel;
   forming flat strips of plastic material into a U-shape so as to provide carrying handles having a central portion and a pair of leg portions, said central portion being folded downwardly with respect to said leg portions;
   applying two of said handles to said web, one of said handles being applied to each of said plies, such that said central portions of said two handles are both folded downwardly in the same direction;
   welding said handles to said plies during a standstill of said web;
   severing said web into individual bag workpieces; and
   providing said workpieces with bag defining seam welds to complete said carrier bags.

2. A method according to claim 1, wherein the intermittently movable two-ply plastics web has an open longitudinal edge, the leg portions of said two handles being positioned between said two plies of said web adjacent the open longitudinal edge thereof, and said leg portions being welded to the inside surfaces of said two plies, wherein a welding together of confronting inside surfaces is avoided.

3. A process according to claim 1 for the manufacture of carrying bags having a bottom seam from a tubing with longitudinal conveyance, characterized in that the tubing is provided in known manner with transverse perforation lines spaced apart by the desired bag length, the carrying handles are welded so that they overlap the perforation lines and their grip portion protrudes behind the respective perforation lines with respect to the feeding direction, the leading tube section which is provided with trailing handles and closed by welding at its leading end is torn off at the perforation lines and advanced to such an extent that the carrying handles are withdrawn from the end of the tubing, and this end is then closed by welding.

4. A process according to claim 3, characterized in that the carrying handles are separately folded into a U shape above and below the tubing and their end portions are welded to the outside of the tubing plies, a mandrel being provided between the tubing plies and bearing through the tubing plies on rollers or the like, which are mounted outside the tubing plies.

5. A process according to claim 3, characterized in that the two carrying handles are made from a two-ply strip and jointly folded, at least one non-weldable layer is provided at least adjacent to their end portions which are to be welded and serves to prevent a welding together of these ends, one tubing ply is formed with two slits, which are aligned with the perforation line of this ply and serve to receive the ends of the carrying handles, which are folded one over the other, the carrying handles are inserted through these slits into the tubing while the tubing ply is raised in its portion preceding the slits and depressed in its portion succeeding the slits, and the carrying handles are then welded to the tubing plies.

6. A process according to claim 1 for the manufacture of carrying bags having side seams from a two-ply web with transverse conveyance, characterized in that the end portions of the carrying handles, which end portions are to be welded, are moved from the open side of the half-tubing into the range of the tubing and are subsequently welded while the tubing is at a standstill, whereafter the individual bags are separated, preferably by a severing and welding operation.

7. A process according to claim 6, characterized in that the end portions of the carrying handles are moved over and under the two-ply web and welded to the outside of the latter and a backing plate is disposed between the plies of the tubing.

8. A method according to claim 2, wherein two of said flat strips of plastic material are taken from a two-ply band and are jointly formed into a U-shape, at least one non-weldable layer being provided at least in the region of said leg portions to be welded to said web, said nonweldable layer serving to avoid a welding together of the leg portions of two opposing handles.

9. A process according to claim 8, characterized in that an interlayer of paper is folded between the two carrying handles.

10. A process according to claim 8, characterized in that the confronting surfaces of the carrying handles are subjected before being folded to a pretreatment with corona discharges to reduce the weldability.

11. A method according to claim 2, wherein said step of forming flat strips of plastic material into a U-shape comprises gripping the end portions of said strip beside the points where they are to be folded, pivotally moving said end portions toward each other in the plane of said strip while said central portion is kept relaxed such that the latter is folded about two fold lines being at an angle of approximately 45° relative to the longitudinal direction of said strip.

12. Apparatus for making carrier bags of weldable plastics, comprising:
   means for intermittently moving a two-ply plastics web through a path of travel;
   means for forming flat strips of plastic material into a U-shape so as to provide carrying handles having a central portion and a pair of leg portions;
   means for folding said central potrion downwardly with respect to said leg portions;
   means for applying two of said handles to said web with one of said handles being applied to each of said two plies such that said central portions of said two handles are both folded downwardly in the same direction;
   means for welding said handles to said plies during a standstill of said web, wherein a welding together of confronting inside surfaces is avoided;
   means for severing said web into individual bag workpieces; and
   means for providing said workpieces with bag defining seam welds to complete said carrier bags.

13. Apparatus according to claim 12 for the manufactore of bags having a bottom seam and carrying handles welded to the outside, characterized by a perforating device which is effective while a tubing is at a standstill and serves to produce transverse perforation lines penetrating through the tubing, a mandrel, which is mounted in the tubing adjacent to a welding station serving to weld the carrying handles, said mandrel bearing through the tubing on rollers mounted in stationary positions outside the tubing, tear-off rolls disposed behind the mandrel in the feeding direction and serving to sever the leading bag workpiece, and a welding device for closing the new leading end of the tubing by welding.

14. Apparatus according to claim 12 for the manufacture of bags having a side seam and carrying handles welded to the outside, characterized by an abutment plate which extends from the open side of the two-ply web between the two plies thereof adjacent to a welding station severing to weld the carrying handles, and a station which succeeds the station for welding the carrying handles and serves for forming transverse seam welds and for transversely severing the web.

15. Apparatus according to claim 14, characterized in that the strip folding devices are arranged so that the end portions of the carrying handles are folded directly into the welding position.

16. Apparatus according to claim 12, for manufacturing bags having a bottom seam and carrying handles welded to the inside, characterized by a cutting and perforating device, which is effective while a tubing is at a standstill and which serves for producing transverse perforation lines through the tubing, which lines include slits adjacent to the areas where the carrying handles are to be attached, a mandrel, which is mounted inside the tubing before the welding station for welding the carrying handles and bears through the tubing on rollers mounted in stationary positions outside the tubing, said mandrel terminating short of the welding station and comprising means for spreading open the slits of the ply of the tubing, a device for folding two superimposed strips into carrying handles, a device for inserting the carrying handles through the slits, a welding device which welds the inserted end portions of the carrying handles to the adjoining tubing ply, tear-off rolls for the leading bag workpiece, and a welding device for closing the new leading end of the tubing by welding.

17. Apparatus for the manufacture of carrying bags having two carrying handles consisting of flat strips folded into U shape and secured adjacent to the top edges of the bag, characterized in that a device for folding the carrying handles comprises a support plate for supporting a strip, two folding plates, which have effective faces which in their initial position are coplanar with the supporting surface of the support plate and are connected to the support plate for a pivotal movement of 180° about axes at an angle of 45° to the longitudinal direction of the strip, and two folding bars, which are pivotally movable inwardly and outwardly in the plane of the strip over the support plate and have folding edges which in their outer position are also at an angle of 45° to the longitudinal direction of the strip and are at right angles to each other and disposed over the support plate closely beside the hinge axes of the folding flaps.

18. Apparatus for the manufacture of carrying bags having two carrying handles consisting of flat strips folded into U shape and attached adjacent to the top edges of the bag, characterized in that a device for folding the carrying handle comprises a tripartite support for supporting a strip, said support comprises a lowerable central part and two stationary outer plates, which are separated from the central part by two parting lines extending at an angle of 45° to the longitudinal direction of the strip, and two folding bars, which are movable with the central part and pivotally movable inwardly and outwardly in the strip plane over the support, said folding bars having folding edges which in their outer position are aligned with the parting lines of the support and said folding bars further having a top surface, which is remote from the central part of the support and coplanar with the supporting surface of the outer plates when the central part is lowered, and two folding sliders are provided, which are movable in the plane of the strip along a straight line at right angles to the longitudinal direction of the strip and have effective edges which are parallel to the parting lines of the support and slide across said parting lines.

19. Apparatus for making carrier bags of weldable plastics comprising:
means for intermittently moving a two-ply plastics web having an open longitudinal edge through a path of travel;
means for forming flat strips of plastic material into a U-shape so as to provide carrying handles having a central portion and a pair of leg portions;
means for folding said central portion downwardly with respect to said leg portions;
means for positioning two of said handles each with their leg portions between the two plies of said web adjacent the open longitudinal edge thereof such that said central portions of said two handles are both folded downwardly in the same direction;
means for welding said leg portions to the inside surfaces of said two piles during a standstill of said web, wherein a welding together of confronting inside surfaces of the web is avoided;
means for severing said web into individual bag workpieces; and
means for providing said workpieces with bag defining seam welds to complete said carrier bags.

20. The apparatus of claim 19 wherein said means for forming flat strips of plastic material into a U-shape is adapted to fold two of said flat strips jointly so as to provide two superimposed U-shaped handles, said last-mentioned means being arranged adjacent the open longitudinal edge of said two-ply web such that the leg portions of said handles enter between the two plies of said web during the folding operation.

21. An apparatus according to claim 19, wherein said means for forming flat strips of plastic material into a U-shape includes two pressure means each cooperating with backing means to engage the end portions of said flat strip therebetween, said pressure means being rotatably mounted about their axes and adapted to move toward each other for pushing said end portions together and pivotally moving them toward each other while said central portion of the strip is kept relaxed.

22. An apparatus according to claim 21, further including feeding and severing means for said strips coupled to said strip forming means.

23. An apparatus according to claim 21, wherein each pressure means is secured to the lower end of a spindle, a pinion is secured to the top end of each spindle, said pinion being in mesh with a rack, each spindle being rotatably mounted in a bearing block, said bearing blocks being movable in vertical guide columns in the direction of the respective spindle axes, the guide columns for each bearing being arranged in a cross-slide, said cross-slides being displaceable at right angles to the spindle axis toward and away of each other, and guides for said cross-slides being provided on a carriage which is movable at right angles to the planes in which said cross-slides are displaceable.

24. Apparatus according to claim 23, characterized in that each pressure plate has associated with it a camshaft, which causes in an appropriate sequence the raising and lowering of the spindle bearings, and the lateral displacement of the cross-slides, whereby the meshing of the pinions with the rack secured to the carriage causes simultaneously, opposite rotations of the spindles, said camshaft causing, if desired, also the forward and rearward movement of the carriage.

25. Apparatus according to claim 23, characterized in that at least rack is secured to the carriage and in mesh with a gear that is secured to a lower feed roll for the strip material.

26. Apparatus according to claim 21 characterized in that leaf springs or the like, are attached to the housing of the strip folding device and disposed below the backing plates to extend beyond the same and to hold down that portion of the upper ply of the tubing which succeeds the slits.

27. An apparatus according to claim 24, further including feeding and severing means for said flat strips coupled to said strip forming means, said strip severing means including a heated band knife secured to a pair of rocker levers which have free arms that are controllable by a cam mounted on a camshaft such that the heated band knife severs a strip from the flat plastic band at a predetermined time during the working cycle.

28. An apparatus according to claim 21, wherein said backing means comprises two backing plates each rotatably mounted in a mounting, the mounting of each of said backing plates extending somewhat beyond its respective backing plate toward the other backing plate and being upwardly directed.

References Cited

UNITED STATES PATENTS 3,034,409  5/1962  Finke et al. _____ 93—351 X
3,392,636  7/1968  Lindley _____ 93—351 X BERNARD STICKNEY, Primary Examiner U.S. Cl. X.R.

93—35; 229—54